(12) United States Patent
Weinrib et al.

(10) Patent No.: US 8,494,580 B1
(45) Date of Patent: Jul. 23, 2013

(54) METHOD OF COORDINATING THE OPERATION OF ADJACENT WIRELESS TRANSCEIVERS ON A SINGLE DEVICE

(75) Inventors: Uri Weinrib, Flumnek (IL); Alon Paycher, Beit Hananya (IL); Keren Dor, Herzelia (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/454,188

(22) Filed: Apr. 24, 2012

(51) Int. Cl.
*H04M 1/00* (2006.01)
(52) U.S. Cl.
USPC ..... 455/553.1; 455/464; 455/450; 455/550.1; 455/11.1; 455/41.2
(58) Field of Classification Search
USPC ............. 455/553.1, 464, 550.1, 11.1, 41.2, 455/450
See application file for complete search history.

(56) References Cited

U.S. PATENT DOCUMENTS

| 6,301,514 | B1 * | 10/2001 | Canada et al. ............... 700/108 |
| 8,090,313 | B2 * | 1/2012 | Rofougaran .................... 455/20 |
| 8,311,498 | B2 * | 11/2012 | Rofougaran ............... 455/168.1 |
| 8,340,587 | B2 * | 12/2012 | Gaal et al. ................. 455/67.11 |

* cited by examiner

*Primary Examiner* — Sanh Phu
(74) *Attorney, Agent, or Firm* — Ronald O. Neerings; Wade James Brady, III; Frederick J. Telecky, Jr.

(57) ABSTRACT

A method is provided of coordinating adjacent first and second wireless networks, comprising: receiving a signal at a controller on a wireless device, the received signal indicating an intended transmission state of the first network during a future time slot, the intended transmission state indicating whether or not the first network intends to transmit first data during the future time slot; transmitting second data in the second network to a remote device if the intended transmission state indicates that the first network does not intend to transmit first data during the future time slot; and controlling transmission of the second data in the second network such that the transmission ends during the future time slot in which the first network does not intend to transmit first data, with sufficient time remaining to allow the second network to receive a reply transmission from the remote device.

23 Claims, 3 Drawing Sheets

METHOD OF COORDINATING THE OPERATION OF ADJACENT WIRELESS TRANSCEIVERS ON A SINGLE DEVICE

TECHNICAL FIELD

The technical field relates in general to a method of coordinating the operation of two adjacent wireless transceivers formed on a single wireless device, and more particularly to a method of controlling the transmission of a second adjacent wireless transceiver so that its receipt of reply signals from a remote device are not interfered with by transmissions of a first adjacent wireless transceiver.

BACKGROUND

As wireless devices have become more compact and wireless technology improves, many such devices now have more than one wireless circuit on them. For example, many cell phones can now connect to a local network, such as a Bluetooth network or a Wi-Fi network, in addition to their basic wireless telephone connection. Unfortunately, this can lead to signal interference in some situations.

For example, if one wireless circuit on a cell phone is transmitting a signal at the same time as another wireless circuit on the cell phone is receiving a signal, the transmitting signal may interfere with the receiving signal because of the near-far problem. In such a situation, the transmitting signal will be relatively more powerful than the received signal, and may overwhelm the received signal to such a degree that the received signal cannot be properly detected.

This is a particular problem when the two wireless circuits operate in close or adjacent frequency bands. For example, one wireless circuit on a single mobile device might operate on a band used by the International Mobile Telecommunications Advanced wireless communication standard, also called the 4G Long Term Evolution (4G LTE) standard, while another wireless circuit on that same mobile device might operate on a band in the industrial, scientific, and medical (ISM) radio bands. For example, the 4G LTE standard can transmit between 2300 MHz and 2400 MHz, while certain wireless LAN devices, such as Bluetooth and IEEE 802.11/Wi-Fi, can employ adjacent ISM bands (between 2402-2472 MHz).

In particular, an unacceptable level of interference may occur when a 4G LTE circuit on a mobile device is transmitting (i.e., uplinking) an uplink signal, while a Bluetooth/Wi-Fi circuit on the same mobile device is simultaneously attempting to receive (i.e., downlink) a downlink signal. In such a circumstance, the 4G LTE uplink signal could be of sufficient power that the RF filters in the Bluetooth/Wi-Fi receiver would be capable of providing sufficient RF isolation to allow the Bluetooth/Wi-Fi receiver to properly receive the Bluetooth/Wi-Fi downlink signal while the 4G LTE uplink signal was being transmitted.

In such a case, the only current solution to this issue is time domain coexistence between the technologies based on signaling between the controllers of the two networks (e.g., between a 4G LTE base station and a Bluetooth/Wi-Fi controller). In other words, the two network controllers must provide information that allows a mobile device to ensure that the transmission and reception of potentially interfering circuits does not occur.

Existing solutions for time domain coexistence typically rely on a real-time indication of the device uplink/downlink status. For example, a 4G LTE base station provides a real-time indication of a device uplink/downlink status (i.e., whether it will be transmitting or receiving signals) according to a 1 ms resolution window. Current devices require Bluetooth/Wi-Fi circuits to only transmit Bluetooth/Wi-Fi signals when the 4G LTE circuit is not transmitting 4G LTE signals, and to terminate such transmitting Bluetooth/Wi-Fi signals whenever this real-time indicator may indicate that the a coexisting 4G LTE circuit might transmit again. This allows the Bluetooth/Wi-Fi circuit a maximum airtime of 1 ms before its next decision point.

This is a particular issue in cases in which the Bluetooth/Wi-Fi circuit requires some sort of acknowledgment of its transmission. In such a case, sufficient time must be allowed for the receipt of the acknowledgment signal before an adjacent 4G LTE circuit begins to transmit. This is because even though the Bluetooth/Wi-Fi circuit could successfully transmit at the same time that a co-located 4G LTE circuit was simultaneously transmitting, the Bluetooth/Wi-Fi circuit could not successfully receive an acknowledgment at the same time that the co-located 4G LTE circuit was transmitting.

As a result, conventional designs only allow Bluetooth/Wi-Fi circuits an opportunity to transmit for 1 ms at a time, allowing sufficient time for an acknowledgment to be received before the next 1 ms window begins. This can significantly limit the throughput of the Bluetooth/Wi-Fi circuit, since it is constantly interrupted every 1 ms to stop transmitting and to monitor the real-time transmission status of the 4G LTE circuit.

Furthermore, this is true even if the 4G LTE circuit does not have any data to transmit in a given resolution window. The Bluetooth/Wi-Fi circuit must nevertheless stop transmitting and wait until the real-time indicator indicates that the current resolution window is free of transmissions before beginning to transmit again.

It would be desirable, therefore to provide an optimized scheme that increases Bluetooth/Wi-Fi throughput by allowing the usage of airtime in increments greater than 1 ms. Such a scheme would allow a Bluetooth/Wi-Fi circuit to transmit its data were quickly, and thus allow it to enter a sleep or low-power state earlier, thereby saving battery power for the device.

SUMMARY

Embodiments described herein provide a system and method for passing imaging data to be sent between an analog front end and a digital front end in an imaging system. In particular, these embodiments apply to a system and method for compressing and decompressing imaging data.

Accordingly, a first disclosed embodiment described herein provides A method of coordinating operation of first and second adjacent wireless networks on a single wireless device, comprising: receiving a signal at a wireless device controller located on the single wireless device, the received signal indicating an intended transmission state of the first adjacent wireless network during a future time slot, the intended transmission state indicating whether or not the first adjacent wireless network intends to transmit first data during the future time slot; transmitting second data in the second adjacent wireless network to a remote device if the intended transmission state indicates that the first adjacent wireless network does not intend to transmit first data during the future time slot; and controlling transmission of the second data in the second adjacent wireless network such that the transmission of the second data ends during the future time slot in which the first adjacent wireless network does not intend to transmit first data, with sufficient time remaining in the future time slot to allow the second adjacent wireless network to receive a reply transmission from the remote device.

A second disclosed embodiment described herein provides A method of coordinating operation of first and second adjacent wireless networks on a single wireless device, comprising: receiving one or more signals at a wireless device controller located on the single wireless device, the one or more received signals indicating intended transmission states of the first adjacent wireless network during a plurality of future time slots, the intended transmission states indicating whether or not the first adjacent wireless network intends to transmit first data during any or all of the plurality of future time slots; storing the intended transmission states of the first adjacent wireless network during the plurality of future time slots in a memory element on the single wireless device; transmitting second data in the second adjacent wireless network if the intended transmission states indicates that the first adjacent wireless network does not intend to transmit first data during at least one of the plurality of future time slots; and controlling transmission of the second data in the second adjacent wireless network such that the transmission of the second data ends during an ending time slot that is one of the plurality of future time slots in which the first adjacent wireless network does not intend to transmit first data, with sufficient time remaining in the ending time slot to allow the second adjacent wireless network to receive a reply transmission from a remote device in the second adjacent wireless network, wherein the second data is transmitted continuously across multiple adjacent time slots selected from the plurality of future time slots when the intended transmission states indicate that the first adjacent network does not intend to transmit first data during the multiple adjacent time slots.

A third disclosed embodiment described herein provides A method of transmitting wireless signals on a wireless device having first and second adjacent wireless devices, from the second adjacent wireless transmitter, comprising: determining one or more intended transmission states of the first adjacent wireless network during a plurality of future time slots, the intended transmission states indicating whether or not the first adjacent wireless network intends to transmit first data during any or all of the plurality of future time slots; transmitting second data in the second adjacent wireless network when the intended transmission states indicate that the first adjacent wireless network does not intend to transmit first data during at least one of the plurality of future time slots; and controlling transmission of the second data in the second adjacent wireless network such that the transmission of the second data ends during an ending time slot that is one of the future time slots in which the first adjacent wireless network does not intend to transmit first data, with sufficient time remaining in the ending time slot to allow the second adjacent wireless network to receive a reply transmission from a remote device in the second adjacent wireless network, wherein the second data is transmitted continuously across multiple adjacent time slots selected from the plurality of future time slots when the intended transmission states indicate that the first adjacent network does not intend to transmit first data during the multiple adjacent time slots.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

In overview, the present disclosure concerns methods to coordinate the operation of two adjacent wireless transceivers formed on a single wireless device. More specifically, it relates to a method of controlling the transmission of a second wireless transceiver on a local device so that its receipt of reply signals from a remote device are not interfered with by transmissions of a first wireless transceiver on the same local device.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

Communication System

Figure 1:
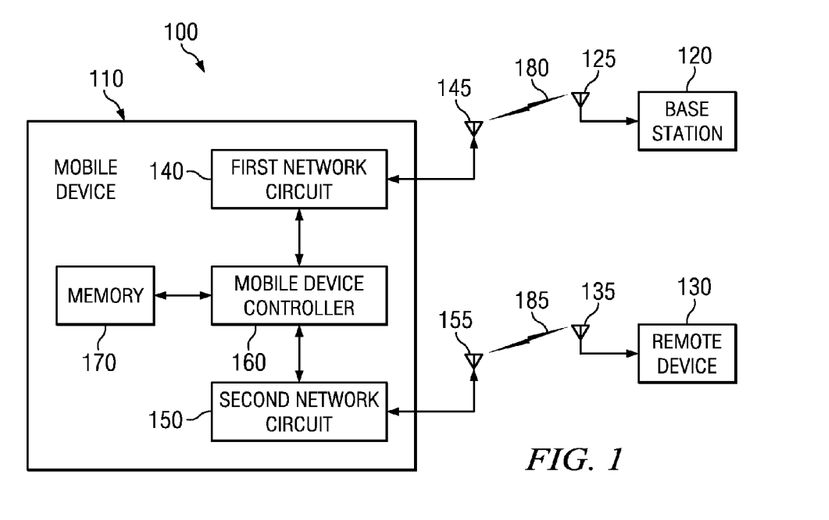
FIG. 1 is a block diagram of a communication system, including a mobile device, a base station, and a remote device, according to disclosed embodiments.

FIG. 1 is a block diagram of a communication system 100, including a mobile device 110, a base station 120, and a remote device 130, according to disclosed embodiments. As shown in FIG. 1, the mobile device 110 includes a first network circuit 140, a first mobile device antenna 145, a second network circuit 150, a second mobile device antenna 155, a mobile device controller 160, and a memory 170. The first base station 120 includes a first base station antenna 125; and the second base station 130 includes a second base station antenna 135.

The first base station 120 operates according to a first protocol and sends and receives first wireless signals 180 to/from the first network circuit 140 on the mobile device 110 through the base station antenna 125. The first base station 120 also coordinates the operation of the first network circuit 140 and any other similar circuits in other devices within the network through control or status signals sent to those devices. In a disclosed embodiment, the base station 120 is a 4G LTE base station and the first protocol is a 4G LTE protocol.

The base station 120 provides a status signal to the first network circuit 140 that indicates the future transmission (i.e., uplink) status of the first network circuit 140. In an embodiment in which the base station 120 is a 4G LTE base station, the status signal is provided on a 1 ms subframe basis, and is provided about 4 ms before the relevant 1 ms subframe actually occurs. Alternate embodiments can use different timing, however.

The remote device 130 operates according to a second protocol different from the first protocol, and sends and receives second wireless signals 185 to/from the second network circuit 150 on the mobile device 110 through the remote device antenna 135. In some embodiments, the remote device 130 may be a second network base station; in others it may be simply another device in the second network. In one disclosed embodiment, the remote device 130 is a Bluetooth device and the second protocol is a Bluetooth protocol. In another embodiment, the remote device 130 is a Wi-Fi device and the second protocol is a Wi-Fi protocol.

The first network circuit 140 operates according to the first protocol and sends and receives the first wireless signals 180 to/from the first base station 120 through the first mobile device antenna 145. In one set of disclosed embodiments the first network circuit 140 is a wireless telephone circuit. In a particular disclosed embodiment, the first network circuit 140 is a 4G LTE circuit and the first protocol is the 4G LTE protocol.

The first network circuit 140 receives the status signal from the base station 120 that indicates the future transmission (i.e., uplink) status, and shares this information with the mobile device controller 160. Since the base station 120 transmits the status signal prior to the relevant subframe, the first network circuit 140 and the mobile device controller 160 will both have advance warning as to whether first network circuit 140 will be transmitting during the relevant sub frame.

In an embodiment in which the first protocol is a 4G LTE protocol, the status signal indicates the transmission status of a future 1 ms subframe, and is transmitted 4 ms ahead of that subframe. Given transmission times and signal decoding times, the first network circuit 140 and the mobile device controller 160 will actually receive the status information in the status signal about 3 ms ahead of the relevant 1 ms subframe. Thus, the first network circuit 140 and the mobile device controller 160 will both receive information as to whether the first network circuit 140 will be transmitting during a subframe that occurs about 3 ms after the status signal is received.

The second network circuit 150 operates according to the second protocol and sends and receives wireless signals 185 to/from the remote device 130 through the second mobile device antenna 155. In one set of disclosed embodiments the second network circuit 150 is a local network circuit. In one particular disclosed embodiment, the second network circuit 150 is a Bluetooth circuit and the second protocol is the Bluetooth protocol. In another particular disclosed embodiment, the second network circuit 150 is a Wi-Fi circuit and second protocol is the Wi-Fi protocol.

The mobile device controller 160 is a circuit provided on the mobile device 110 for controlling and coordinating the operation of the first network circuit 140 and the second network circuit 150. In particular, the mobile device controller 160 coordinates when each network circuit 140, 150 transmits and receives data. In various embodiments it can be a UART interface, a general-purpose microcomputer, an ASIC, or any other device capable of coordinating the operation of the two network circuits 140, 150. In an embodiment in which the base station 120 is a 4G LTE base station, the mobile device controller 160 is connected to the memory 170, and uses the memory 170 for storage of needed information.

The memory 170 is a volatile or nonvolatile, readable and writable memory that the mobile device controller 160 can use to store information during runtime regarding the operation of the first network circuit 140 and the second network circuit 150. In various embodiments this can be implemented using DRAM, SRAM, EEPROM, flash memory, or any other suitable type of memory.

As noted above, in one disclosed embodiment, the first network circuit 140 can be a 4G LTE mobile telephone transceiver circuit, and the second network circuit 150 can be one of: a Bluetooth transceiver circuit and a Wi-Fi transceiver circuit. However, alternate embodiments could use different types of first and second potentially interfering network protocols.

Uplink Timing

Figure 2:
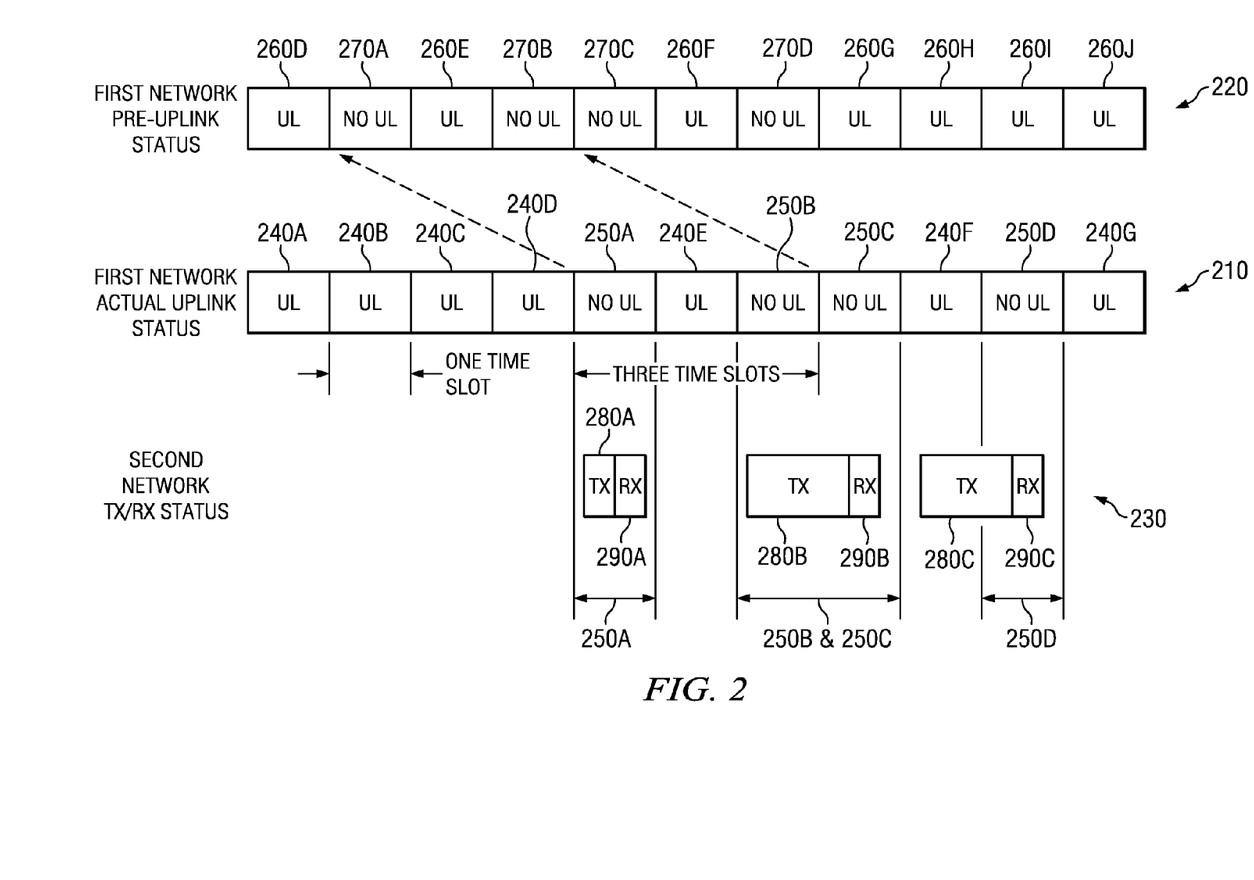
FIG. 2 is timing diagram of uplink time slots in the communication system of FIG. 1 according to disclosed embodiments.

FIG. 2 is timing diagram 200 of uplink time slots in the communication system of FIG. 1 according to disclosed embodiments. As shown in FIG. 2, available transmission time is divided into a plurality of consecutive time slots. These timeslots include uplink timeslots 240A-240G (generically referred to as uplink timeslots 240), during which a first network circuit 140 is transmitting (i.e., uplinking) signals, and non-uplink timeslots 250A-250D (generically referred to as non-uplink timeslots 250), during which the first network circuit 140 is not transmitting (i.e., uplinking) signals. This real-time transmission status is shown by the first network actual uplink status 210 in FIG. 2.

As noted above, however, the base station 120 transmits transmitting/receiving instructions to the first network circuit 140 that are forwarded, at least in part, as status information to the mobile device controller 160. This status information indicates a future uplink status for the first network circuit 140. This status information tells the mobile device 110 what the transmission (i.e., uplink) status of the first network circuit 140 will be a certain number of timeslots in the future. In one disclosed embodiment, in which the first network is a 4G LTE network, the base station 120 transmits the transmitting/receiving instructions (i.e., the status information) four timeslots ahead of time (i.e., 4 ms ahead of time), and the mobile device controller 160 ultimately receives the status information about three timeslots ahead of time (i.e., 3 ms ahead of time). This gives the mobile device controller information about the uplink status of the first network circuit 140 for the next three timeslots. This information is shown in the first network pre-uplink status 220 in FIG. 2.

As shown in the first network pre-uplink status 220, the future information is reported in terms of the same size timeslots as occur in the first network. These future timeslots include future uplink timeslots 260D-260J (generically referred to as future uplink timeslots 260) which indicate that the first network circuit 140 will be transmitting (i.e., uplinking) signals, and future non-uplink timeslots 250A-250D (generically referred to as future non-uplink timeslots 250), which indicate that the first network circuit 140 will not be transmitting (i.e., uplinking) signals.

The mobile device controller 160 uses this pre-uplink status information to ensure that the second network circuit 150 does not run into a near-far problem during timeslots in which the first network circuit 140 is transmitting. It does this by making certain that the second network circuit 150 does not provoke a remote device 130 to transmit a signal that the second network circuit 150 must successfully receive during an uplink timeslot 240. In particular, it makes certain that the second network circuit 150 does not end a transmission that requires an acknowledgment during an uplink timeslot 240. Rather, it makes certain that any acknowledgment transmission provoked by the second network circuit 150 will occur during a non-uplink timeslot 250 with sufficient time for the acknowledgment signal to be sent by the remote device 130 and successfully received by the second network circuit 150. Examples of this are shown in the second network transmit/receive status 230 of FIG. 2.

As shown in the second network transmit/receive status 230, this control may be accomplished in several ways. In a first situation, a transmitted signal 280A and a received signal 290A are respectively transmitted and received within a single non-uplink timeslot 250A. This can be arranged because the mobile device controller 160 knows ahead of time when the non-uplink timeslot 250A will occur (based on the first network pre-uplink status 220), and can instruct the first network circuit 140 to end its transmission within the non-uplink timeslot 250A with sufficient time for an acknowledgment signal (i.e., the received signal 290A) to be received by the second network circuit 150.

In a second situation, a transmitted signal 280B and a received signal 290B are respectively transmitted and received within two contiguous non-uplink timeslots 250B and 250C. This is possible in the disclosed embodiment because the mobile device controller 160 knows three timeslots ahead of time when the non-uplink timeslots 250B and 250C will occur, and can instruct the first network circuit 140 to end its transmission within the last of these two contiguous timeslots 250C with sufficient time for an acknowledgment signal (i.e., the received signal 290B) to be received by the second network circuit 150. In this situation, the transmission signal 280B can be longer than a single time slot (i.e., it can be greater in duration than 1 ms in the disclosed embodiment).

Although in the example of the second situation, signals are transmitted during two contiguous non-uplink timeslots 250, in alternate embodiments the transmission could take place through a larger number of contiguous non-uplink timeslots 250, as limited by the future information provided by the first network pre-uplink status 220. For example, in the disclosed embodiment in which information is provided three timeslots ahead of time, this second situation could also apply to three contiguous non-uplink timeslots 250. Furthermore, in embodiments in which the future information was greater than three timeslots in length, larger numbers of contiguous non-uplink timeslots 250 could be used.

In a third situation, a transmitted signal 280C can begin during an uplink timeslot 240F, provided that it will end during a non-uplink timeslot 250D with sufficient time for the second network circuit 150 to receive an acknowledgment signal 290C. In fact, the transmitted signal 280C can transmit across multiple uplink timeslots 240 or non-uplink timeslots 250, only provided that it ends during a non-uplink timeslots 250. This is because there is no near-far problem when the first network circuit 140 and the second network circuit 150 are both transmitting, only when one is transmitting and the other is receiving. In a practical sense, however, the length of the transmitted signal 280C will be limited by the duration of the future information. This is because the transmitted signal 280C cannot be begun unless it is certain that there will be a non-uplink timeslot 250 during which it can end. And the mobile device controller 160 only has information regarding a time period equal to the length of the future information, (i.e., three timeslots in disclosed embodiment).

It should be noted that the disclosed duration of the future information is provided by way of example only for a system in which the first network is a 4G LTE network. Longer or shorter durations are possible in alternate embodiments, depending upon what kind of future information is provided by a base station 120 in the first network.

Operation of the Communication System

Figure 3:
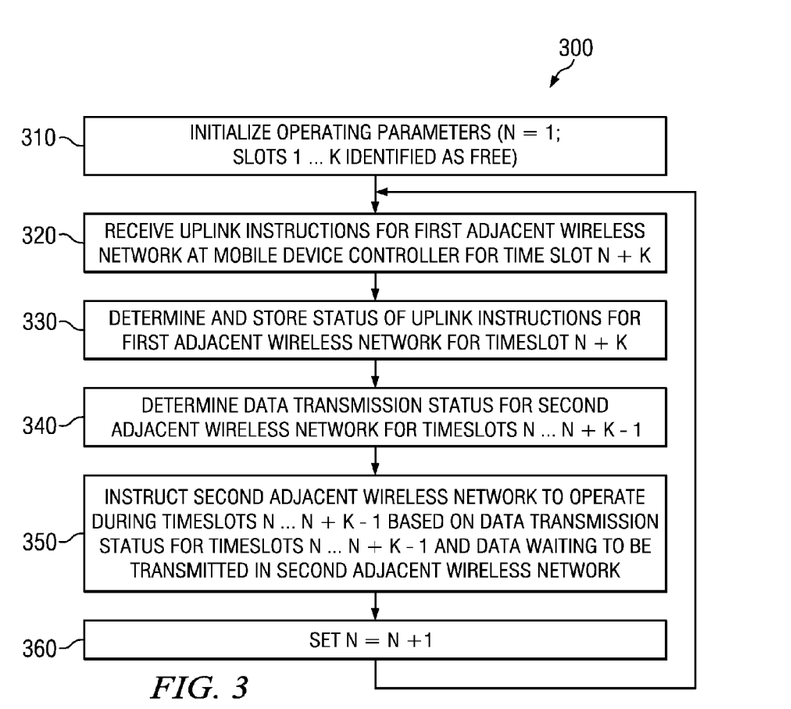
FIG. 3 is a flow chart of the operation of the communication system of FIG. 1 according to disclosed embodiments.

FIG. 3 is a flow chart 300 of the operation of the communication system 100 of FIG. 1 according to disclosed embodiments. In this flowchart, the variable N represents an index of the current timeslot, while the variable K represents the duration of future information provided to the mobile device 110 by the base station 120.

As shown in FIG. 3, the operation 300 begins by initializing operation parameters. In particular, N is set equal to 1, and timeslots 1 through K are identified as free. (310) One way that the timeslots 1 through K can be identified as free is by storing that information in the memory 170. The first K timeslots are identified as free because the base station 120 must instruct a first network circuit 140 to transmit, and the first network circuit 140 will receive this information K timeslots ahead of time. Thus, the first network circuit 140 will not transmit during the first K timeslots of operation.

The mobile device 110 then receives uplink instructions for the first network circuit 140 (i.e., for the first adjacent wireless network) for a timeslot (N+K), which is sent to the mobile device controller 160 as status information. (320) In other words, the mobile device controller 160 receives information as to whether or not the first network circuit 140 will be transmitting (i.e., uplinking) a signal during timeslot (N+K).

The mobile device controller 160 then determines and stores the status of the uplink instructions (status information) for the first network circuit 140 (i.e., for the first adjacent wireless network) for the timeslot (N+K). (330) In other words, the mobile device controller 160 determines whether timeslot (N+K) is occupied or free and stores that information in the memory 170. If the uplink instructions indicate that the first network circuit 140 will be transmitting (i.e., uplinking) a signal during timeslot (N+K), the status of the uplink instructions will indicate that the timeslot is occupied; and if the uplink instructions indicate that the first network circuit 140 will not be transmitting a signal during timeslot (N+K), the status of the uplink instructions will indicate that the timeslot is free.

The mobile device controller 160 then determines the data transmission status for the second network controller 150 (i.e., the second adjacent wireless network) for timeslots N through (N+K−1). (340) In other words, the mobile device controller 160 determines whether the second network controller 150 has any data that it desires to send during the next K timeslots starting from the $N^{th}$ timeslot.

The mobile device controller 160 then instructs the second network controller 150 (i.e., the second adjacent wireless network) to operate during timeslots N through (N+K−1) (i.e., the next K timeslots) based on the data transmission status for timeslots N through (N+K−1) and based on the data waiting to be transmitted by the second network controller 150 (i.e., the data waiting to be transmitted in the second adjacent wireless network). (350) The mobile device controller 160 can do this because it has just determined what data the second network controller 150 desires to send, and it knows, based on information in the memory 170, the uplink status of each of timeslots N through (N+K−1) with respect to the first network circuit 140. In other words, it knows which, if any, of the next K timeslots will be free.

In particular, the mobile device controller 160 will only allow the second network controller 150 to transmit data if it can be certain that the data transmission will end during a free timeslot with sufficient time left over for the second network controller 150 to receive an acknowledgment signal for that transmission from a remote device 130. If all of the timeslots N through (N+K−1) are identified as occupied, the mobile device controller 160 will not allow the second network circuit 150 to start transmitting.

Finally, the mobile device 110 will increment N to (N+1). (360) In doing so, the mobile device 110 will move on to the next timeslot.

Processing then continues with the mobile device 110 receiving uplink instructions for the first network controller 140, which are forwarded to the mobile device controller 160 as status information for timeslot (N+K), for this new value of N. (320) This process then continues during the operation of the mobile device 110.

Figure 4:
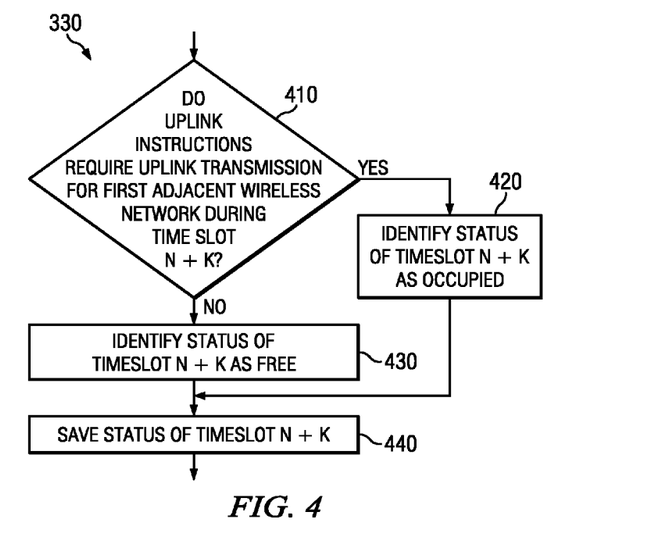
FIG. 4 is a flow chart of the operation of determining and storing the status of uplink instructions of FIG. 3 according to disclosed embodiments.

FIG. 4 is a flow chart 330 of the operation of determining and storing the status of uplink instructions of FIG. 3 according to disclosed embodiments.

As shown in FIG. 4, operation of this process 330 begins by the mobile device controller 160 determining whether uplink instructions (status information) require uplink transmissions by the first network circuit 140 (i.e. the first adjacent wireless network) during timeslot (N+K). (410) in other words, the mobile device controller 160 determines whether the first network circuit 140 has been instructed to transmit signals during timeslot (N+K).

If the first network circuit 140 has been instructed to transmit an uplink signal during timeslot (N+K), then timeslot (N+K) will be identified as occupied. (420)

If, however, the first network circuit 140 has not been instructed to transmit an uplink signal during timeslot (N+K), then timeslot (N+K) will be identified as free. (430)

Once the status of timeslot (N+K) has been determined to be either occupied or free, the status of timeslot (N+K) is then saved in the memory 170 (440), and processing continues.

Figure 5:
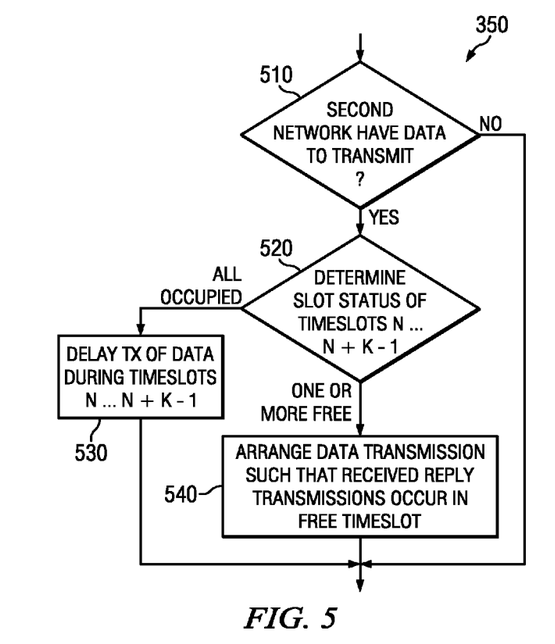
FIG. 5 is a flow chart of the operation of instructing a second adjacent wireless network to operate of FIG. 3 according to disclosed embodiments.

FIG. 5 is a flow chart 350 of the operation of instructing a second adjacent wireless network to operate of FIG. 3 according to disclosed embodiments.

As shown in FIG. 5, operation of this process 350 begins by having the mobile device controller 160 determines whether the second network circuit 150 (i.e., the second adjacent wireless network) has any data to transmit to a remote device 130. (510) the mobile device controller 160 can determine this based on the data transmission status for the second network circuit 150, which it obtained in operation 340 of the process shown in FIG. 3.

If the mobile device controller 160 determines that the second network circuit 150 has no data to transmit, then the operation 350 ends, and processing continues to operation 360 of the process shown in FIG. 3.

If, however, the mobile device controller 160 determines that a second network circuit 150 has data to transmit, then the mobile device controller 160 further determines the slot status of timeslots N through (N+K−1). (520) In particular, the mobile device controller 160 determines whether all of these time slots are occupied or whether one or more of these slots are free by reading the relevant information stored in the memory 170.

If the mobile device controller 160 determines that all of timeslots N through (N+K−1) are occupied, then it instructs the second network circuit 150 to delay the transmission of data during all of timeslots N through (N+K−1). (530) It does this because if all of these timeslots are occupied, there is no possibility that the second network circuit 150 could end its transmission during a free time slot during which an acknowledgment could be received from a remote device 130. Transmission of the data must be delayed until there is at least one free timeslot known to be coming up.

If, however, the mobile device controller 160 determines that at least one of the timeslots N through (N+K−1) is free, then it instructs the second network circuit 150 to arrange data transmission such that any received a reply transmissions occur during a free timeslot. (540) In other words, knowing which of the next K timeslots will be free, the mobile device controller 160 can instruct the second network circuit 150 to arrange its transmission to maximize transmission time, while still ensuring that there will be no near-far problem when the second network circuit 150 must receive an acknowledgment for its transmission from the remote device 130.

In general, maximum transmission time for the second network circuit 150 can be obtained by beginning transmission as soon as possible, and ending transmission in the last free timeslot within the window of information provided. In such a situation in the disclosed embodiment, if the last free timeslot is the second or third timeslot, the second network circuit 150 can transmit across most of two or three time slots before it must stop for a single acknowledgment. This allows for fast transmission of data from the second network circuit 150 to the remote device 130, making for greater throughput, and allowing the second network circuit 150 to quickly enter a sleep mode, thus lowering power consumption.

As noted above with respect to FIG. 2, there are multiple ways in which such transmissions can be arranged, depending upon the exact distribution of free timeslots. In particular, while it is necessary that reception of any signals at the second network circuit 150 take place during a free timeslot, it is not necessary that the entirety of transmissions by the second network circuit 150 take place during a free time slot. Such transmissions may take place during free or occupied timeslots as needed.

Although the above description refers to a 4G LTE mobile phone transceiver, and a co-located Bluetooth/Wi-Fi transceiver, this is by way of example only. The methods described above are equally applicable to any potentially interfering, co-located transceivers. As a result, these methods should not be considered limited only to use with a 4G LTE transceiver and a co-located Bluetooth/Wi-Fi transceiver.

CONCLUSION

This disclosure is intended to explain how to fashion and use embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of coordinating operation of first and second adjacent wireless transceivers on a single wireless device, comprising:

receiving a signal at a wireless device controller located on the single wireless device, the received signal indicating an intended transmission state of the first adjacent wireless transceiver during a future time slot, the intended transmission state indicating whether or not the first adjacent wireless transceiver intends to transmit first data during the future time slot;

transmitting second data from the second adjacent wireless transceiver to a remote device if the intended transmission state indicates that the first adjacent wireless transceiver does not intend to transmit first data during the future time slot; and controlling transmission of the second data from the second adjacent wireless transceiver such that the transmission of the second data ends during the future time slot in which the first adjacent wireless transceiver does not intend to transmit first data, with sufficient time remaining in the future time slot to allow the second adjacent wireless transceiver to receive a reply transmission from the remote device.

2. The method of claim 1, wherein the reply transmission is an acknowledgement transmission.

3. The method of claim 1, wherein the first and second wireless transceivers share adjacent frequency bands.

4. The method of claim 1, wherein the first wireless transceiver operates using the International Mobile Telecommunications Advanced (4G Long Term Evolution) standard.

5. The method of claim 1, wherein the second wireless transceiver is one of a Bluetooth transceiver and a WiFi transceiver.

6. The method of claim 1, wherein the future time slot occur between 2 and 3 milliseconds after the operation of receiving the signal at the wireless device controller.

7. The method of claim 1, wherein
the time slots are about 1 millisecond in duration, and
the intended transmission state indicates a transmission state during a time slot two or three time slots in the future compared to a current time slot.

8. A method of coordinating operation of first and second adjacent wireless transceivers on a single wireless device, comprising:

receiving one or more signals at a wireless device controller located on the single wireless device, the one or more received signals indicating intended transmission states of the first adjacent wireless transceiver during a plurality of future time slots, the intended transmission states indicating whether or not the first adjacent wireless transceiver intends to transmit first data during any or all of the plurality of future time slots;

storing the intended transmission states of the first adjacent wireless network during the plurality of future time slots in a memory element on the single wireless device;

transmitting second data in the second adjacent wireless transceiver to a remote device if the intended transmission states indicates that the first adjacent wireless transceiver does not intend to transmit first data during at least one of the plurality of future time slots; and controlling transmission of the second data from the second adjacent wireless transceiver such that the transmission of the second data ends during an ending time slot that is one of the plurality of future time slots in which the first adjacent wireless transceiver does not intend to transmit first data, with sufficient time remaining in the ending time slot to allow the second adjacent wireless transceiver to receive a reply transmission from the remote device, wherein the second data is transmitted continuously across multiple adjacent time slots selected from the plurality of future time slots when the intended transmission states indicate that the first adjacent transceiver does not intend to transmit first data during the multiple adjacent time slots.

9. The method of claim 8,
wherein the reply transmission is an acknowledgement transmission.

10. The method of claim 8,
wherein a plurality of initial time slots during a transmission period are provided with initial intended transmission states indicating that the first adjacent wireless transceiver does not intend to transmit data during the initial time slots.

11. The method of claim 8,
wherein the first and second adjacent wireless transceivers share adjacent frequency bands.

12. The method of claim 8,
wherein the first wireless transceiver operates using the International Mobile Telecommunications Advanced (4G Long Term Evolution) standard.

13. The method of claim 8,
wherein the second wireless transceiver is one of a Bluetooth transceiver and a WiFi transceiver.

14. The method of claim 8,
wherein the future time slots occur between 1 and 3 milliseconds after the operation of receiving one or more signals at the wireless device controller.

15. The method of claim 8, wherein
the time slots are about 1 millisecond in duration, and
the one or more intended transmission states indicate transmission states during one, two, or three time slots in the future compared to a current time slot.

16. A method of transmitting wireless signals on a wireless device having first and second adjacent wireless transceivers, from the second adjacent wireless transceiver, comprising:

determining one or more intended transmission states of the first adjacent wireless transceiver during a plurality of future time slots, the intended transmission states indicating whether or not the first adjacent wireless transceiver intends to transmit first data during any or all of the plurality of future time slots;

transmitting second data from the second adjacent wireless transceiver to a remote device when the intended transmission states indicate that the first adjacent wireless transceiver does not intend to transmit first data during at least one of the plurality of future time slots; and controlling transmission of the second data from the second adjacent wireless transceiver such that the transmission of the second data ends during an ending time slot that is one of the future time slots in which the first adjacent wireless transceiver does not intend to transmit first data, with sufficient time remaining in the ending time slot to allow the second adjacent wireless transceiver to receive a reply transmission from the remote device, wherein the second data is transmitted continuously across multiple adjacent time slots selected from the plurality of future time slots when the intended transmission states indicate that the first adjacent network does not intend to transmit first data during ending time slot.

17. The method of claim 16,
wherein the reply transmission is an acknowledgement transmission.

18. The method of claim 16,
wherein a plurality of initial time slots during a transmission period are provided with initial intended transmission states indicating that the first adjacent wireless transceiver does not intend to transmit data during the initial time slots.

19. The method of claim 16,
wherein the first and second adjacent wireless transceivers share adjacent frequency bands.

20. The method of claim 16,
wherein the first wireless transceiver operates using the International Mobile Telecommunications Advanced (4G Long Term Evolution) standard.

21. The method of claim 16,
wherein the second wireless transceiver is one of a Bluetooth transceiver and a WiFi transceiver.

22. The method of claim 16,
wherein the future time slots occur between 1 and 3 milliseconds after the operation of determining the one or more intended transmission states.

23. The method of claim 16, wherein
the time slots are about 1 millisecond in duration, and
the one or more intended transmission states indicate transmission states during one, two, or three time slots in the future compared to a current time slot.

* * * * *